United States Patent [19]

Kim et al.

[11] Patent Number: 5,593,588

[45] Date of Patent: Jan. 14, 1997

[54] COMPOSITE REVERSE OSMOSIS MEMBRANE HAVING ACTIVE LAYER OF AROMATIC POLYESTER OR COPOLYMER OF AROMATIC POLYESTER AND AROMATIC POLYAMIDE

[75] Inventors: Jae-Jin Kim; Chang-Keun Kim; Seung-Yeop Kwak, all of Seoul, Rep. of Korea

[73] Assignee: Korea Institute of Science and Technology, Seoul, Rep. of Korea

[21] Appl. No.: 569,903

[22] Filed: Dec. 8, 1995

[30] Foreign Application Priority Data

Jul. 7, 1995 [KR] Rep. of Korea .................. 95-19906

[51] Int. Cl.⁶ ............................................... B01D 29/00
[52] U.S. Cl. ............... 210/490; 210/500.27; 210/500.38; 210/500.41; 210/500.37
[58] Field of Search .................. 210/490, 500.38, 210/500.37, 500.27, 500.36, 500.21, 500.41, 506, 654; 264/45.1, 45.5, 45.6, 60; 96/10; 528/196

[56] References Cited

U.S. PATENT DOCUMENTS

| | | | |
|---|---|---|---|
| 3,153,008 | 10/1964 | Fox | 528/196 |
| 3,567,632 | 3/1971 | Richter et al. | |
| 3,744,642 | 7/1973 | Scala et al. | 210/490 |
| 3,878,109 | 4/1975 | Ikeda et al. | 264/41 |
| 3,904,519 | 9/1975 | McKinney, Jr. et al. | |
| 3,926,798 | 12/1975 | Cadotte | 427/244 |
| 3,951,815 | 4/1976 | Wrasidlo | |
| 4,005,012 | 1/1977 | Wrasidlo | 210/500.37 |
| 4,039,440 | 8/1977 | Cadotte | 264/41 |
| 4,277,344 | 7/1981 | Cadotte | 210/654 |
| 4,360,659 | 11/1982 | Sikdar | 528/196 |
| 4,366,062 | 12/1982 | Kurihara et al. | 210/490 |
| 4,557,949 | 12/1985 | Kurihara et al. | 427/244 |
| 4,559,139 | 12/1985 | Uemura et al. | 210/490 |
| 4,606,943 | 8/1986 | Rak et al. | 427/244 |
| 4,626,468 | 12/1986 | Sundet | 210/654 |
| 4,643,829 | 2/1987 | Sundet | 210/500.38 |
| 4,783,346 | 11/1988 | Sundet | 210/490 |
| 4,913,816 | 4/1990 | Waite | 210/490 |
| 5,051,178 | 9/1991 | Uemura et al. | 210/490 |
| 5,356,461 | 10/1994 | Sluma et al. | 96/10 |

FOREIGN PATENT DOCUMENTS

| | | |
|---|---|---|
| 0085111 | 8/1983 | European Pat. Off. |
| 0211633 | 2/1987 | European Pat. Off. |
| 55-38164 | 10/1980 | Japan |
| 55-147106 | 11/1980 | Japan |
| 55-49524 | 12/1980 | Japan |

Primary Examiner—Ana Fortuna
Attorney, Agent, or Firm—Oblon, Spivak, McClelland, Maier & Neustadt, P.C.

[57] ABSTRACT

A composite reverse osmosis membrane may advantageously be prepared by the process comprising applying porous support layer onto a nonwoven fabric and then forming an ultrathin active layer of an aromatic polyester superposed thereon, the active layer being prepared by the interfacial polymerization of an aqueous solution of polyhydric phenol and a solution of aromatic acyl halide dissolved in an organic solvent; or applying a porous support layer onto a nonwoven fabric and then forming an ultrathin active layer of a copolymer of aromatic polyester and aromatic polyamide superposed thereon, the active layer being prepared by the interfacial polymerization of a mixed aqueous solution of polyhydric phenol and an aromatic amine with a solution of aromatic acyl halide dissolved in an organic solvent. The composite membrane of the present invention has improvements in properties, such as water-permeability, chlorine-resistance, oxidation stability, salt rejection rate, and durability.

11 Claims, No Drawings

COMPOSITE REVERSE OSMOSIS MEMBRANE HAVING ACTIVE LAYER OF AROMATIC POLYESTER OR COPOLYMER OF AROMATIC POLYESTER AND AROMATIC POLYAMIDE

BACKGROUND OF THE INVENTION

1. Field of the Invention

The present invention relates to a commercially applicable composite reverse osmosis membrane which has improved water-permeability, salt rejection rate, chlorine resistance, and so forth. More particularly, the invention relates to a composite reverse osmosis membrane which comprises a porous support layer and a superposed active layer of a cross-linked aromatic polyester or copolymer of aromatic polyester and aromatic polyamide.

2. Description of the Prior Art

Processes for removing salts from seawater, brine, waste water, and so forth by means of a reverse osmosis separation membrane have gained wide attention in view of the economics of energy and resources, environmental protection and so on.

The first composite reverse osmosis membrane, an asymmetrical membrane formed of cellulose acetate, is disclosed in U.S. Pat. Nos. 3,133,132 and 3,133,137 issued to Leob and Sourirajan in 1962. However, this separation membrane was susceptible to hydrolysis and not sufficiently resistant to microbial attack and chemical substances. In addition, in order to increase the water-permeability, it was necessary to lower the resistance to the operating pressure and durability to a significant degree, and thus, such membrane has been applicable only in limited fields.

Many attempts have been made to develop reverse osmosis membranes of new materials which do not suffer from the defects of those membranes prepared from cellulose acetate: aromatic polyamide or polyamide hydrazide membranes as disclosed in U.S. Pat. No. 3,567,632; polyamide acid membranes as disclosed in Japanese Patent Publication No. (sho) 55-37282 and U.S. Pat. No. 3,878,109; crosslinked polyamide acid membranes as disclosed in Japanese Patent Publication No. (sho) 56-3769; polysulfone amide and polyarylene oxide membranes. However, those membranes did not provide any remarkable advantages over the cellulose acetate membrane in terms of their performance.

Unlike the above asymmetric membranes, composite membranes having a porous support layer and an ultrathin active layer superposed thereon, which plays a critical role in the separation performance of membranes, have been developed and widely used in the field of the separation membranes. These membranes can be optimized by properly selecting the materials for the active and porous support layers, and also can be advantageously stored and transported in a dry state. This differentiates such membranes from the prior art asymmetric membranes, which have to be stored and transported in a wet state.

There are two types of composite membranes: one is a composite membrane comprising a support layer and an active layer superposed thereon, as taught and exemplified in U.S. Pat. Nos. 3,744,642, 3,926,798, 4,277,344, 4,557, 949, and 4,366,062, and Japanese Laid-Open Patent Publication Nos. (sho) 55-147106 and (sho) 58-24303, etc.; and the other is a composite membrane comprising a support layer, an active layer, and a gel layer interposed therebetween for the purpose of reinforcing the mechanical strength of the membrane, as suggested in U.S. Pat. Nos. 4,039,440, 3,951,815, 4,005,012 and 4,559,139, and Japanese Laid-Open Patent Publication No. (sho) 49-133282, and Japanese Patent Publication Nos. (sho) 55-49,524 and 55-38,164.

However, these conventional composite membranes do not fulfill the requirements for reverse osmosis separation such as water-permeability, salt rejection rate, chlorine-resistance, heat-resistance, chemicals-resistance, pressure-resistance, oxidation stability, etc. For example, U.S. Pat. No. 3,904,519 discloses a process for the preparation of an active layer by the interfacial polymerization of an acyl halide having two reactive groups and an aromatic amine having two reactive groups, or by the reaction of the two amine reactive groups and an aromatic amine having a carboxylic group. However, this product does not provide satisfactory results in terms of water-permeability, chlorine-resistance, oxidation stability, etc. To increase chlorine-resistance and oxidation stability, a composite film type reverse osmosis separation membrane has been prepared from an aromatic amine having two or more reactive groups and an acyl halide or cyclohexane tricarbonyl chloride having two or more reactive groups (See, U.S. Pat. Nos. 4,277,344, 4,606,943, 4,643,829 and 4,626,468; and European Patent Application No. 86 3059440). Those membranes also do not provide satisfactory results in terms of membrane properties including water-permeability, chlorine-resistance, and oxidation stability.

SUMMARY OF THE INVENTION

It is therefore an object of the present invention to provide a composite reverse osmosis membrane having improved water-permeability, salt-rejection rate, chlorine-resistance, oxidation stability, and durability.

Further objects and advantages of the invention will become apparent through reading the remainder of the specification.

DETAILED DESCRIPTION OF THE INVENTION

In order to solve the problems encountered in the above prior art techniques, we, the present inventors have conducted extensive studies on an improved composite reverse osmosis membrane. As a result, it has been found that a novel composite reverse osmosis membrane can be obtained by securing a porous support layer onto a nonwoven fabric, and then forming an ultrathin active layer of crosslinked aromatic polyester thereon which is prepared by interfacial polymerization of an aqueous solution of polyhydric phenol having two or more hydroxyl reactive groups and a solution of an aromatic acyl halide having two or more reactive groups; or alternatively, forming an ultrathin active layer of a copolymer of a crosslinked aromatic polyester and an aromatic polyamide thereon which is prepared by interfacial polymerization of a mixed aqueous solution of polyhydric phenol having two or more hydroxyl reactive groups and an aromatic amine having two or more primary amine reactive group with a solution of an aromatic acyl halide having two or more reactive groups.

The present invention will be described in greater detail below.

According to one aspect of the invention, a composite reverse osmosis membrane is provided which comprises a polymeric porous support layer and an active layer of an aromatic polyester superposed thereon, the active layer being prepared by the interfacial polymerization of an aqueous solution of polyhydric phenol of formula (I), wherein, $R_f$ represents an alkylene, alkylidene, cycloalkylene, cycloalkylidene or arylene linkage, or a linkage selected from the group consisting of ether, carbonyl, amine, and a sulfur- or phosphorus-containing linkage;

Ar and Ar' are each arene radicals;

Y represents a bromine or chlorine atom, a hydroxyl group, an alkyl or alkoxy group, which can be substituted for hydrogen on the Ar or Ar';

d represents a number of 0 or more;

X represents a chlorine or bromine atom, or a monovalent hydrocarbon selected from the group consisting of alkyl, aryl, and cycloalkyl group;

e represents a number of 0 to a maximum controlled by the number of replaceable hydrogens on the $R_f$; and aa, bb and cc are each a number of 0 or more, provided that aa, bb and cc, or aa and cc can not be 0 simultaneously, and when bb is zero, Ar and Ar' are directly linked together via carbon; with a solution in an organic solvent of an aromatic acyl halide of formula (II), $$\underset{(Y')_i}{(Ar)-(COHal)_h} \qquad (II)$$

wherein, Hal represents a halogen atom;

h represents a number of no less than 2;

i represents a number of no more than 4;

Y' represents a hydrogen, bromine or chlorine atom, a hydroxyl group, an alkyl group, an alkoxy group, a carboxylic acid group, or a carboxylate group; and Ar has the same meanings as defined in formula (I); or an aromatic acyl halide of formula (III), $$\underset{(Y')_i \quad (Y')_i}{(ClCO)_j-(Ar)-X-(Ar')-(COHal)_k} \qquad (III)$$

wherein, j and k are each the number of acyl halides, and satisfying $j+k \geq 2$;

Ar, Ar' and X have each the same meanings as defined in formula (I); and

Hal, Y' and i have each the same meanings as defined in formula (II).

The aqueous solution of polyhydric phenol preferably has a pH of 8 to 13.

The monomer concentration of the polyhydric phenol and the aromatic acyl halide are preferably 0.01% to 10% by weight, respectively.

According to another aspect of the invention, a composite reverse osmosis membrane is provided which comprises a polymeric porous support layer and an active layer of a copolymer of an aromatic polyester and an aromatic polyamide superposed thereon, the active layer being prepared by the interfacial polymerization of a mixed aqueous solution of polyhydric phenol of formula (I), wherein, $R_f$ represents an alkylene, alkylidene, cycloalkylene, cycloalkylidene or arylene linkage, or a linkage selected from the group consisting of ether, carbonyl, amine, and a sulfur- or phosphorus-containing linkage;

Ar and Ar' are each arene radicals;

Y represents a bromine or chlorine atom, a hydroxyl group, an alkyl or alkoxy group, which can be substituted for hydrogen on the Ar or Ar';

d represents a number of 0 or more;

X represents a chlorine or bromine atom, or a monovalent hydrocarbon selected from the group consisting of alkyl, aryl, and cycloalkyl group;

e represents a number of 0 to a maximum controlled by the number of replaceable hydrogens on the $R_f$; and aa, bb and cc are each a number of 0 or more, provided that aa, bb and cc, or aa and cc can not be 0 simultaneously, and when bb is zero, Ar and Ar' are directly linked together via carbon; and an aromatic amine of formula (IV), $$Ar''(NH_2)_b \qquad (IV)$$

wherein, Ar" represents an aromatic ring which does not react with an acyl halide reactive group except for the amine groups in formula (IV) above, the hydrogen atoms on the amine-free positions can be substituted by alkyl, alkoxy, sulfonic acid, sulfonate, carboxylic acid, carboxylate, amino, acyl, hydroxyl, halogen or nitro; and b represents a number of 2 or more; with a solution in an organic solvent of an aromatic acyl halide of formula (II), $$\underset{(Y')_i}{(Ar)-(COHal)_h} \qquad (II)$$

wherein, Hal represents a halogen atom;

h represents a number of no less than 2;

i represents a number of no more than 4;

Y' represents a hydrogen, bromine or chlorine atom, a hydroxyl group, an alkyl group, an alkoxy group, a carboxylic acid group, or a carboxylate group; and Ar has the same meaning as defined in formula (I); or an aromatic acyl halide of formula (III), $$\underset{(Y')_i \quad (Y')_i}{(ClCO)_j-(Ar)-X-(Ar')-(COHal)_k} \qquad (III)$$

wherein, j and k are each the number of acyl halides, and satisfying $j+k \geq 2$;

Ar, Ar' and X have each the same meanings as defined in formula (I); and

Hal, Y' and i have each the same meanings as defined in formula (II).

The ratio of the weight of the polyhydric phenol monomer to the combined weight of the polyhydric phenol monomer and the aromatic amine monomer is approximately 0.05 to 1, and the pH of the mixed aqueous solution is preferably adjusted to 8 to 13.

The active layer according to the present invention can be, depending on the intended use of the membrane, composed either of a crosslinked aromatic polyester or a copolymer of a crosslinked aromatic polyester and a crosslinked aromatic polyamide. The selection of the aromatic polyester or the copolymerized aromatic polyester depends on intended use of the composite membrane. The thickness of the active layer can be within a range of 10 to 1,000 nm, while the thickness and the component ratio can be adjusted so as to meet with the intended use of the composite membrane.

The polyhydric phenols of formula (I) which can be used for the preparation of the active layer are well known from U.S. Pat. Nos. 3,153,008 and 4,360,659. Examples of such phenols include 4,4'-dihydroxybiphenyl; 2,2-bis(hydroxyphenyl)propane; 2,2-bis(4-hydroxyphenyl)butane; 2,2-bis(4-hydroxy-3-phenyl)propane; 4,4'-ethylidenebisphenol; 4,4'-dihydroxydiphenylmethane; bis(4-hydroxyphenyl)sulfone; 4,4'-dihydroxybenzophenone; 4,4'-dihydroxydiphenyl ether; 4,4'-dihydroxydiphenyl sulfide; bis(4-hydroxyphenyl)cyclohexane; 2,2-bis(4-hydroxyphenyl)hexafluoropropane; 4,4'-(1-α-methylbenzylidene)bisphenol; 2,2-bis(4-hydroxy- 3,5-dimethylphenyl) propane; 2,2-bis(4-hydroxy-3,5-dimethylphenyl)sulfone; 4,4'-methylene(2,6-dimethylphenol); 2,2-bis(3,5-dibromo-4-hydroxyphenyl)propane; 2,2-bis(3,5-dichloro-4-hydoxyphenyl)propane; α,α,α'-tris(4-hydoxyphenyl)-1-ethyl-4-isopropylbenzene; 2,2-bis(3-amino-4-hydroxyphenyl)hexafluoropropane; 2,2-bis(3,4-dihydroxyphenyl)hexafluoropropane; 3,3'-diamino-4,4'-dihydroxybiphenyl; Catechol; Resorcinol; and 1,2,3-benzenetriol.

The aromatic acyl halides of formula (II) or (III) having two or more reactive groups can be polycondensated with a hydroxyl or amine reactive group to give a copolymer having an ester or amide linkage, respectively.

The organic solvents which may be used for dissolving the aromatic acyl halides mentioned above include water immiscible organic solvents such as heptane, n-hexane and trichlorotrifluoroethane.

As the porous support layer of the composite reverse osmosis membrane, nonwoven fabric reinforced porous film, particularly polysulfone porous film is preferably used.

The composite reverse osmosis membrane of the present invention is suitable for the removal of salts in aqueous solutions containing a solute, that is, for the desalination of seawater or salt removal from brine, and the ultrapurification of water.

PREFERRED EMBODIMENT OF THE INVENTION

The present invention will be illustrated in greater detail by way of the following examples. The examples are presented for illustration purposes only and should not be construed as limiting the invention which is properly delineated in the claims.

EXAMPLE 1

A solution of 18% by weight of polysulfone in dimethylformamide was applied onto a polyester nonwoven fabric and then immediately dipped into water to give a gelled nonwoven fabric-reinforced porous polysulfone support film. This film had more or less large-sized pores on the side in contact with the nonwoven fabric, while the opposite side gelled with water of the film had pores of 15 nm or less in size. The resulted polysulfone support film was dipped into a solution of 0.5% by weight of 4,4'-dihydroxybiphenyl taken up in an aqueous sodium hydroxide solution (pH 10) over a period of 5 minutes or more. Excess of the aqueous 4,4'-dihydroxybiphenyl solution from the surface of the polysulfone support film was squeezed through a rubber roller, and a solution of 0.5% by weight of trimesoyl chloride (TMC) in n-hexane was then immediately applied to the film. The film was subjected to interfacial polymerization for approximately 30 minutes, and the resulting composite membrane of a polysulfone/crosslinked polyester was dried in an oven at a temperature of 60° C.

A reverse osmosis test was conducted by determining water-permeability and salt rejection rate at a temperature of 25° C. at 50 atmospheric pressure using a 5,000 ppm synthetic brine. The resulting composite membrane was found to have a salt rejection rate of 90.1% and water-permeability of 3,300 L/m$^2$.day (81 gfd (gallon/ft$^2$.day)).

EXAMPLE 2 to 6

The procedures described in Example 1 were repeated, except that 4,4'-dihydroxybiphenyl and trimesoyl chloride were used in an amount specified in Table 1 below. The results are shown in Table 2.

TABLE 1

| Example | Component (% by weight) | |
| --- | --- | --- |
| | 4,4'-Dihydroxybiphenyl | Trimesoly Chloride |
| 2 | 0.25 | 0.5 |
| 3 | 1 | 1 |
| 4 | 2 | 0.5 |
| 5 | 2 | 1 |
| 6 | 0.5 | 2 |

TABLE 2

| Example | Salt Rejection Rate (%) | Water-Permeability (L/m$^2$ · day(gfd)) |
| --- | --- | --- |
| 2 | 89.0 | 3,505(86) |
| 3 | 89.5 | 3,178(78) |
| 4 | 90.6 | 3,137(77) |
| 5 | 90.9 | 3,056(75) |
| 6 | 90.1 | 3,259(80) |

EXAMPLE 7

The procedures described in Example 1 were repeated, except that 4,4'-dihydroxybiphenyl was replaced with 2,2-bis(4-hydroxyphenyl)propane. The resulting composite membrane was found to have a salt rejection rate of 58% and water-permeability of 7,985 L/m$^2$.day (196 gfd).

EXAMPLE 8

The procedures described in Example 1 were repeated, except that 4,4'-dihydroxybiphenyl was replaced with 2,2-bis(4-hydroxy-3,5-dimethylphenyl)propane. The resulting composite membrane was found to have a salt rejection rate of 30% and water-permeability of 7,985 L/m$^2$.day (196 gfd).

EXAMPLE 9

The procedures described in Example 1 were repeated, except that 4,4'-dihydroxybiphenyl was replaced with 4,4'-dihydroxydiphenyl ether. The resulting composite membrane was found to have a salt rejection rate of 81% and water-permeability of 3,993 L/m$^2$.day (98 gfd).

EXAMPLE 10

The nonwoven fabric-reinforced polysulfone support film prepared from Example 1 was dipped into a 1:1 mixed solution of an aqueous solution of 0.5% by weight of 4,4'-dihydroxybiphenyl and an aqueous solution of 0.25% by weight of meta-phenylenediamine over a period of 5 minutes or more. A solution of 0.5% by weight of trimesoyl chloride (TMC) in n-hexane was immediately applied to the film and the film was subjected to interfacial polymerization for approximately 30 minutes. The resulting composite membrane of polysulfone/crosslinked polyester and crosslinked polyester was dried in oven at a temperature of 60° C.

The resulting composite membrane was found to have a salt rejection rate of 96.5% and water-permeability of 2,200 L/m$^2$.day (54 gfd).

EXAMPLE 11

The procedures described in Example 9 were repeated, except that meta-phenylenediamine was replaced with para-phenylenediamine. The resulting composite membrane was found to have a salt rejection rate of 93.2% and water-permeability of 1,955 L/m².day (48 gfd).

EXAMPLE 12

The procedures described in Example 9 were repeated, except that meta-phenylenediamine was replaced with diaminobenzoic acid. The resulting composite membrane was found to have a salt rejection rate of 94% and water-permeability of 2,526 L/m².day (62 gfd).

EXAMPLE 13 to 18

The procedures described in Example 10 were repeated, except that an aqueous 4,4'-dihydroxybiphenyl solution and aqueous meta-phenylenediamine solution were used in the amounts specified in Table 3 below. The results are shown in Table 3 below.

TABLE 3

| Example | Aqueous 4,4'-Dihydroxybiphenyl solution/aqueous meta-phenylene diamine solution | Salt Rejection Rate (%) | Water-Permeability (L/m² · day (gfd) |
|---|---|---|---|
| 13 | 10/1 | 94.6 | 3,178(78) |
| 14 | 5/1 | 95.0 | 2,852(70) |
| 15 | 2/1 | 95.5 | 2,729(67) |
| 16 | 1/2 | 98.1 | 2,037(50) |
| 17 | 1/5 | 99.1 | 1,671(41) |
| 18 | 1/10 | 99.4 | 1,507(37) |

EXAMPLE 19

The procedures described in Example 1 were repeated, except that a solution of trimesoyl chloride in n-hexane was replaced by a solution of 0.25% by weight of trimesoly chloride and 0.25% by weight of terephthaloyl chloride in n-hexane. The resulting composite membrane was found to have a salt rejection rate of 82% and water-permeability of 5,012 L/m².day (123 gfd).

EXAMPLE 20

The procedures described in Example 1 were repeated, except that a solution of trimesoyl chloride in n-hexane was replaced with a solution of 0.25% by weight of trimelitic anhydride chloride and 0.25% by weight of trimesoyl chloride in n-hexane. The resulting composite membrane was found to have a salt rejection rate of 76% and water-permeability of 6,275 L/m².day (154 gfd).

EXAMPLE 21

The composite membrane prepared by the process of Example 1 was dipped into a solution prepared by mixing 1% by volume of aqueous solution of sulfuric acid and 1% by volume of glutaric acid dialdehyde at a temperature of 30° C. over a period of 24 hours and dried at an ambient temperature for the purpose of increasing the degree of crosslinking of the composite membrane. The resulting composite membrane was found to have a salt rejection rate of 93% and water-permeability of 2,608 L/m².day (64 gfd).

EXAMPLE 22

The procedures described in Example 21 were repeated, except that the composite membrane prepared by the process in accordance with Example 1 was replaced by the composite membrane prepared by the process in accordance with Example 10. The resulting composite membrane was found to have a salt rejection rate of 98.2% and water-permeability of 1,711 L/m².day (42 gfd).

EXAMPLE 23

The purpose of the Example was to demonstrate chlorine resistance of the composite membrane. For the chlorine resistance test, each of the composite membranes prepared by the processes in accordance with Examples 1, 10, 14 and 17 was dipped into an aqueous solution of 100 ppm sodium chlorite over a period of 24 hours and then dried. The test data are set forth in Table 4.

TABLE 4

| Example | Salt Rejection Rate (%) | Water-Permeability (L/m² · day(gfd)) |
|---|---|---|
| 1 | 90.5 | 3,219(79) |
| 10 | 96.3 | 2,241(55) |
| 14 | 95.1 | 2,934(72) |
| 17 | 98.9 | 1,630(40) |

What is claimed is:

1. A composite reverse osmosis membrane comprising a polymeric porous support layer and an active layer of an aromatic polyester superposed thereon, the active layer being prepared by the interfacial polymerization of an aqueous solution having a pH of 8 to 13, of polyhydric phenol of formula (I), wherein, $R_f$ represents an alkylene, alkylidene, cycloalkylene, cycloalkylidene or arylene linkage, or a linkage selected from the group consisting of ether, carbonyl, amine, and a sulfur-or phosphorus-containing linkage;

Ar and Ar' are each arene radicals;

Y represents a bromine or chlorine atom, a hydroxyl group, an alkyl or alkoxy group, which can be substituted for hydrogen on the Ar or Ar';

d represents a number equal to or greater than zero;

X represents a chlorine or bromine atom, or a monovalent hydrocarbon selected from the group consisting of alkyl, aryl, and cycloalkyl group;

e represents a number of 0 to a maximum controlled by the number of replaceable hydrogens on the $R_f$; and aa and cc are each a number equal to or greater than one; and bb is a number equal to or greater than zero, and when bb is a number equal to zero, Ar and Ar' are directly linked together via carbon; with a solution in an organic solvent of an aromatic acyl halide of formula (II),

wherein, Hal represents a halogen atom;

h represents a number of no less than 2;

i represents a number of no more than 4;

Y' represents a hydrogen, bromine or chlorine atom, a hydroxyl group, an alkyl group, an alkoxy group, a carboxylic acid group, or a carboxylate group; and Ar is an arene radical; or an aromatic acyl halide of formula (III),

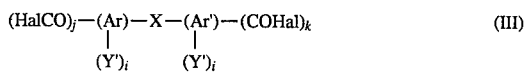 (III)

wherein, j and k are each the number of acyl halides, and satisfying j+k≧2;

Ar, Ar' and X have each the same meanings as defined in formula (I); and

Hal, Y' and i have each the same meanings as defined in formula (II).

2. The composite reverse osmosis membrane of claim 1, wherein said polyhydric phenol and said aromatic acyl halide has a concentration of 0.01% to 10% by weight, respectively.

3. The composite reverse osmosis membrane of claim 1, wherein said organic solvents for dissolving said aromatic acyl halides are water immiscible organic solvents selected from the group consisting of heptane, n-hexane and trichlorotrifluoroethane.

4. The composite reverse osmosis membrane of claim 1, wherein said composite membrane is further dipped into a mixed aqueous solution of sulfuric acid and glutaric dialdehyde, and then is dried.

5. The composite reverse osmosis membrane of claim 1, wherein said polymeric porous support layer is a nonwoven fabric-reinforced polysulfone support film.

6. A composite reverse osmosis membrane comprising a polymeric porous support layer and an active layer of a copolymer of an aromatic polyester and an aromatic polyamide superposed thereon, the active layer being prepared by the interfacial polymerization of a mixed aqueous solution having a pH of 8 to 13 of polyhydric phenol of formula (I), wherein, $R^f$ represents an alkylene, alkylidene, cycloalkylene, cycloalkylidene or arylene linkage, or a linkage selected from the group consisting of ether, carbonyl, amine, and a sulfur-or phosphorus-containing linkage;

Ar and Ar' are each arene radicals;

Y represents a bromine or chlorine atom, a hydroxyl group, an alkyl or alkoxy group, which can be substituted for hydrogen on the Ar or Ar';

d represents a number equal to or greater than zero;

X represents a chlorine or bromine atom, or a monovalent hydrocarbon selected from the group consisting of alkyl, aryl, and cycloalkyl group;

e represents a number of 0 to a maximum controlled by the number of replaceable hydrogens on the $R_f$; and aa and cc are each a number equal to or greater than one; and bb is a number equal to or greater than zero, and when bb is a number equal to zero, Ar and Ar' are directly linked together via carbon; and an aromatic amine of formula (IV),

 (IV)

wherein, Ar" represents an aromatic ring which does not react with an acyl halide reactive group except for the amine groups in formula (IV) above, the hydrogen atoms on the amine-free positions can be substituted by alkyl, alkoxy, sulfonic acid, sulfonate, carboxylic acid, carboxylate, amino, acyl, hydroxyl, halogen or nitro; and b represents a number of 2 or more; with a solution in an organic solvent of an aromatic acyl halide of formula (II),

 (II)

wherein, Hal represents a halogen atom;

h represents a number of no less than 2;

i represents a number of no more than 4;

Y' represents a hydrogen, bromine or chlorine atom, a hydroxyl group, an alkyl group, an alkoxy group, a carboxylic acid group, or a carboxylate group; and Ar is an arene radical; or an aromatic acyl halide of formula (III),

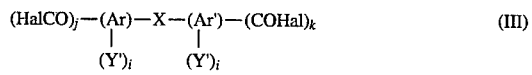 (III)

wherein, j and k are each the number of acyl halides, and satisfying j+k≧2;

Ar, Ar' and X have each the same meanings as defined in formula (I); and

Hal, Y' and i have each the same meanings as defined in formula (II).

7. The composite reverse osmosis membrane of claims 6, wherein said polyhydric phenol and aromatic acyl halide have a concentration of 0.01% to 10% by weight, respectively.

8. The composite reverse osmosis membrane of claims 6, wherein the ratio of the weight of the polyhydric phenol monomer to the combined weight of the polyhydric phenol monomer and the aromatic amine monomer is approximately 0.05 to 1.

9. The composite reverse osmosis membrane of claim 6, wherein said organic solvents for dissolving said aromatic acyl halides are water immiscible organic solvents selected from the group consisting of heptane, n-hexane and trichlorotrifluoroethane.

10. The composite reverse osmosis membrane of claim 6, wherein said composite membrane is further dipped into a mixed aqueous solution of sulfuric acid and glutaric dialdehyde, and then is dried.

11. The composite reverse osmosis membrane of claim 6, wherein said polymeric porous support layer is a nonwoven fabric-reinforced polysulfone support film.

* * * * *

UNITED STATES PATENT AND TRADEMARK OFFICE
CERTIFICATE OF CORRECTION

PATENT NO. : 5,593,588

DATED : January 14, 1997

INVENTOR(S) : Jae-Jin KIM, et al.

It is certified that error appears in the above-identified patent and that said Letters Patent is hereby corrected as shown below:

Column 2, line 67, following "formula (I)," insert

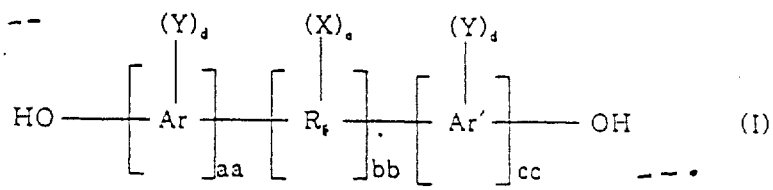

Column 3, line 54, following "formula (I)," insert

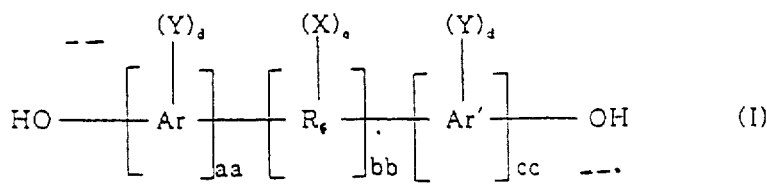

UNITED STATES PATENT AND TRADEMARK OFFICE
CERTIFICATE OF CORRECTION

PATENT NO. : 5,593,588

DATED : January 14, 1997

INVENTOR(S) : Jae-Jin KIM, et al.

It is certified that error appears in the above-identified patent and that said Letters Patent is hereby corrected as shown below:

Column 8, line 32, following "formula (I)," insert

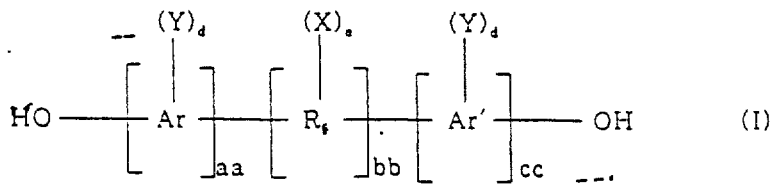

Column 9, line 32, following "formula (I)," insert

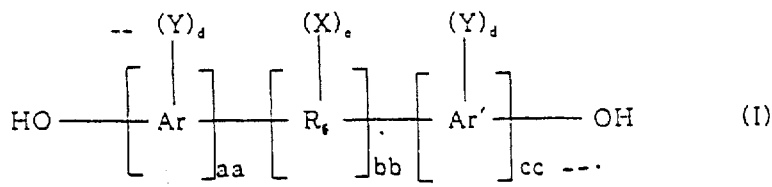

Signed and Sealed this

Tenth Day of February, 1998

Attest:

BRUCE LEHMAN

Attesting Officer

Commissioner of Patents and Trademarks